United States Patent [19]

Hines et al.

[11] Patent Number: 4,813,330

[45] Date of Patent: Mar. 21, 1989

[54] CODED CARD FOR USE IN A MELODY PLAYING APPARATUS

[75] Inventors: Robin H. Hines; Michael R. Glasscock; D. Bruce Johnson, all of Tullahoma, Tenn.

[73] Assignee: Quantime, Inc., Tullahoma, Tenn.

[21] Appl. No.: 71,916

[22] Filed: Jul. 10, 1987

Related U.S. Application Data

[62] Division of Ser. No. 771,024, Aug. 30, 1985, Pat. No. 4,490,025.

[51] Int. Cl.[4] .................... G06K 19/08; G06K 21/00; G09B 15/02; G10H 7/00

[52] U.S. Cl. .................................. 84/483 A; 84/1.18; 84/1.28; 283/91; 283/93; 283/47; 235/489; 235/491; 235/494

[58] Field of Search .................. 84/1.18, 1.28, 471 R, 84/483 R, 483 A; 283/83, 85, 91, 93, 47, 904; 340/347 R, 825.25; 235/375, 487, 489, 491, 494

[56] References Cited

U.S. PATENT DOCUMENTS

| | | | |
|---|---|---|---|
| 3,115,803 | 12/1963 | Pedicano | 84/470 R |
| 3,186,291 | 6/1965 | Pedicano | 84/470 R |
| 3,376,778 | 4/1968 | Musser | 84/483 R |
| 3,460,425 | 8/1969 | Kiepe | 84/470 R |
| 3,592,098 | 7/1971 | Zadig | 84/471 R |
| 4,470,334 | 9/1984 | Barlow et al. | 84/1.28 |
| 4,614,144 | 9/1986 | Sagara et al. | 84/1.28 |

*Primary Examiner*—Stanley J. Witkowski

*Attorney, Agent, or Firm*—Cushman, Darby & Cushman

[57] ABSTRACT

A coded card for use in a melody playing apparatus. The coded card has four quadrants, each quadrant having a different melody therein. A synchronization code is encoded down the center of the card between alternates ones of the quadrants. By alternately rotating and turning the card over, each of the four quadrants with different melodies and the synchronization code will appear at a same predetermined quadrant position. Therefore, when playing on the melody playing apparatus, each of the melodies can be decoded thereby.

4 Claims, 6 Drawing Sheets

| | | INPUTS | | | | |
|---|---|---|---|---|---|---|
| FREQ | NOTE | D | C | B | A | FUNCTION |
| | | -- | -- | -- | -- | RECORD MODE* |
| 262 | C | -- | -- | -- | O | |
| 294 | D | -- | -- | O | -- | |
| 311 | D# | -- | -- | O | O | |
| 330 | E | -- | O | -- | -- | |
| 349 | F | -- | O | -- | O | |
| 376 | F# | -- | O | O | -- | |
| 392 | G | -- | O | O | O | |
| 940 | A | O | -- | -- | -- | |
| 466 | A# | O | -- | -- | O | |
| 494 | B | O | -- | O | -- | |
| 523 | C | O | -- | O | O | |
| 587 | D | O | O | -- | -- | |
| 699 | E | O | O | -- | O | |
| PAUSE | | O | O | O | -- | |
| | | O | O | O | O | PLAYBACK MODE* |

*MODES USED IN MEMORY VERSION ONLY

-- LIGHT BLOCKAGE (NO HOLE)

O LIGHT TRANSMISSION (HOLE)

| FREQ | NOTE | INPUTS D | C | B | A | FUNCTION |
|---|---|---|---|---|---|---|
| | | -- | -- | -- | -- | RECORD MODE * |
| 262 | C | -- | -- | -- | O | |
| 294 | D | -- | -- | O | -- | |
| 311 | D# | -- | -- | O | O | |
| 330 | E | -- | O | -- | -- | |
| 349 | F | -- | O | -- | O | |
| 376 | F# | -- | O | O | -- | |
| 392 | G | -- | O | O | O | |
| 940 | A | O | -- | -- | -- | |
| 466 | A# | O | -- | -- | O | |
| 494 | B | O | -- | O | -- | |
| 523 | C | O | -- | O | O | |
| 587 | D | O | O | -- | -- | |
| 699 | E | O | O | -- | O | |
| PAUSE | | O | O | O | -- | |
| | | O | O | O | O | PLAYBACK MODE * |

* MODES USED IN MEMORY VERSION ONLY
-- LIGHT BLOCKAGE (NO HOLE)
O LIGHT TRANSMISSION (HOLE)

CODED CARD FOR USE IN A MELODY PLAYING APPARATUS

This is a division of application Ser. No. 771,024 now U.S. Pat. No. 4,490,025 filed Aug. 30, 1985.

FIELD OF THE INVENTION

The present invention is directed to an entertainment board game in which individuals or groups attempt to identify the melody or song of a portion of a piece of music after listening to several musical notes of the music.

BACKGROUND OF THE INVENTION

Entertainment board games for home use are quite popular on that they provide for family or friendly entertainment in the convenience of one's home. Accordingly, a number of board games have gained wide popularity, such as Monopoly, Trivial Pursuit, etc. However, heretofore there has not been available an entertainment board game for home use which involved the identificatin of a melody or song after the players listened to a portion of the melody. Although this type of game has been quite popular on syndicated television shows and mass audience participation type shows, the inability to develop an inexpensive means for playing a portion of the music to be identified, while at the same time reproducing the music with sufficient precision to allow its identification by players has prevented the playing of this type of game in the home.

SUMMARY OF THE INVENTION

The present invention has been developed in order to solve the deficiencies noted above. More specifically, the present invention provides an apparatus for playing a portion of a melody so that users of the apparatus can, in the context of a competitive board game, attempt to identify the melody.

The apparatus of the present invention includes a device for encoding the portion of the melody to be reproduced and a device for reproducing the portion of the melody by decoding the encoding device. The reproducing device includes a decoder for generating electric signals corresponding to the portion of the melody to be reproduced and a converter for converting the generated electric signals to musical notes with sufficient precision that the melody can be identified by those familiar with it.

In a preferred embodiment of the present invention, the encoding device comprises a card having a predetermined pattern of holes punched through its surface. The predetermined pattern of holes in the card, represent the specific musical notes of the portion of the melody which is to be reproduced.

In one version of the entertainment board game according to the present invention, each player is provided with a switch for interrupting the music when a player can identify the melody's title (or when a particular player believes that the melody's title can be identified).

Figure 4:
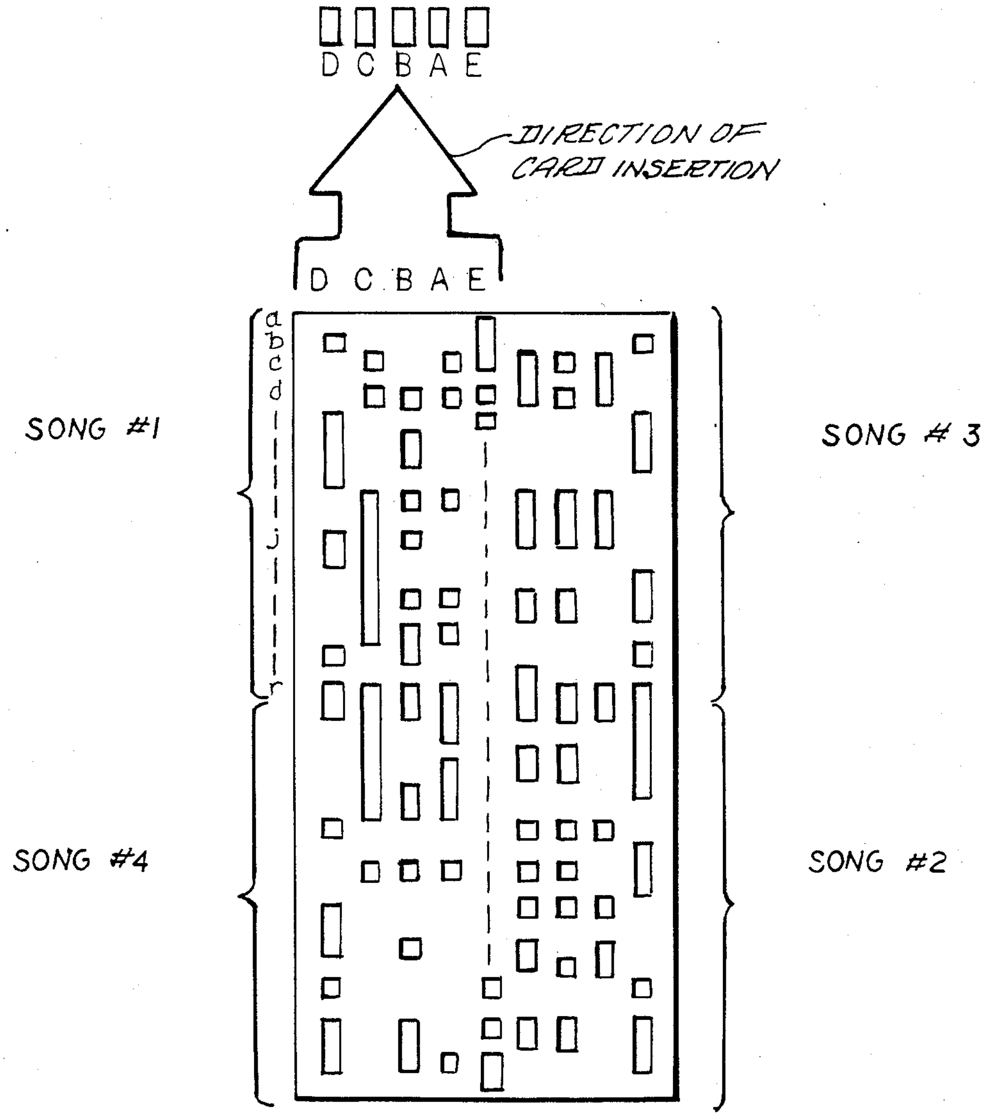
FIG. 4 represents one example of a melody encoding device for use in the invention.
Figure 6A:
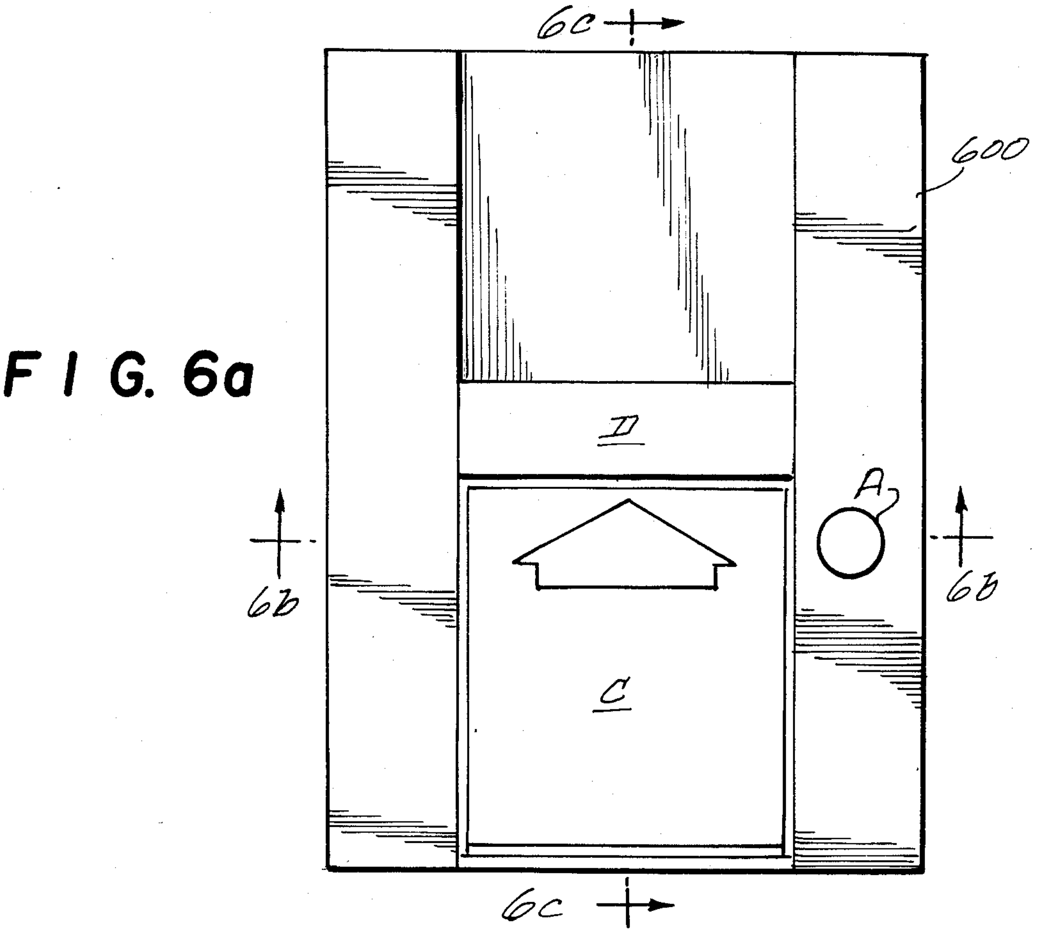
Figure 6B:
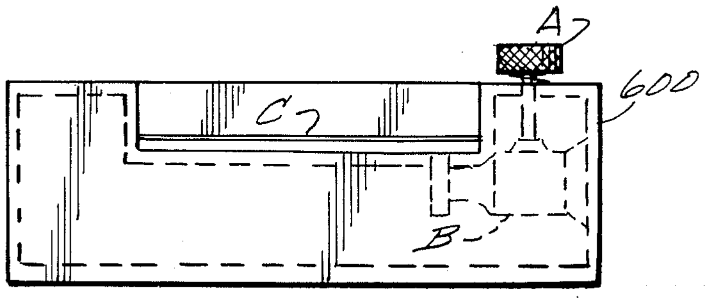
Figure 6C:
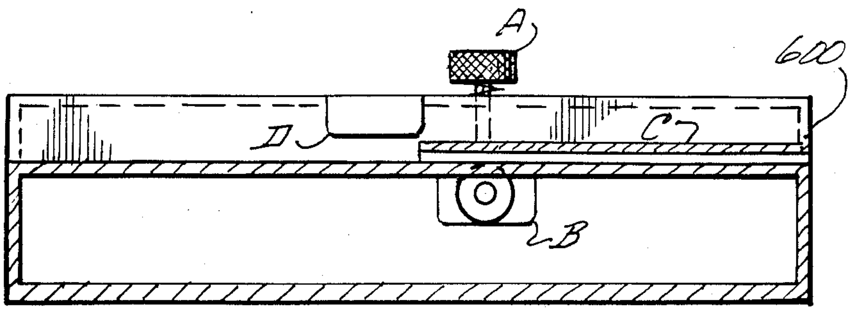
Figure 7A:
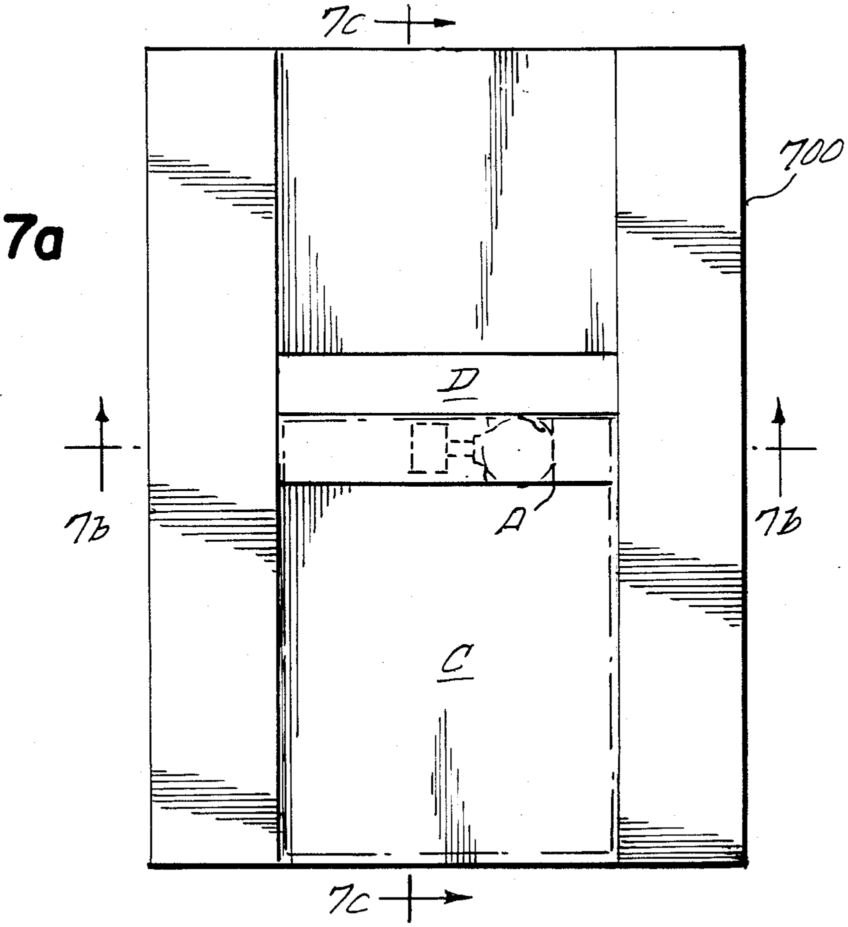
Figure 7B:
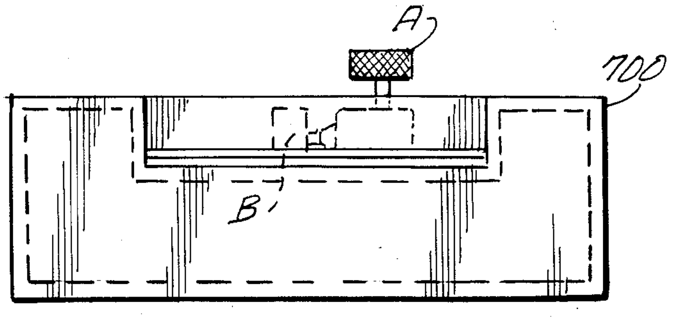
Figure 7C:
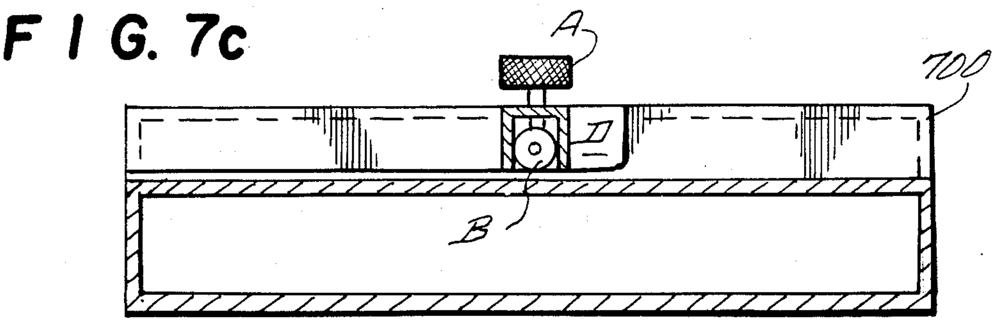

FIGS. *6a–6c* show various views of one example of a device used in decoding the melody encoding device of FIG. 4; and FIGS. *7a–7c* show various views of another example of a device used in decoding the melody encoding device of FIG. 4.

DETAILED DESCRIPTION OF THE INVENTION

Figure 1:
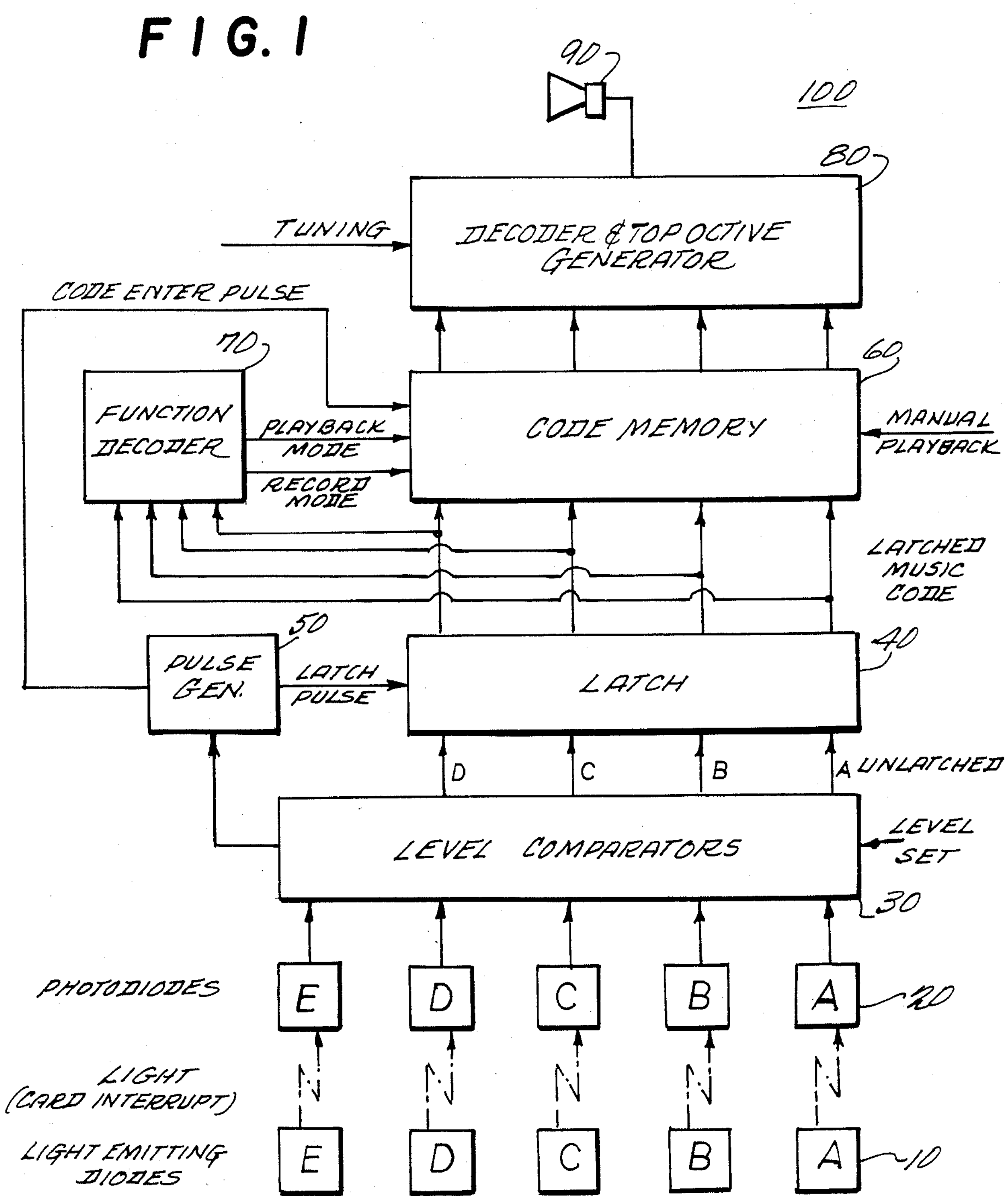
FIG. 1 represents a schematic block diagram of a first embodiment of the invention.

FIG. 1 shows a schematic block diagram of a first embodiment of the invention. As noted above, the musical notes of a portion of a melody to be reproduced can be encoded onto a card. The card can contain the notes of four distinct melodies positioned at the quadrants of the card, as shown in FIG. 4. The card is inserted into the device 100 of FIG. 1 between the sets of light emitting diodes 10 and photodiodes 20.

More specifically, the device 100 employs five light emitting diode/photodiode pairs A–E. Four of the pairs, A–D, are used to decode a standard ABCD format which represents a musical note of a full octave including flats and sharps according to the table shown in FIG. 5. Thus, a card having holes punched in positions A and C, as shown by position b on the card in FIG. 4, when inserted into the device, would allow activation of photodiodes A and C and such photodiode activation would represent the musical note F, as shown by the table in FIG. 5. The fifth pair of light emitting diode/photodiode E is used as a synchronization guide for latching the encoded note to be reproduced and entering the musical note into memory 60 of device 100, as will be described in greater detail below.

Therefore, in the invention as shown in FIG. 1, the photodiodes A, B, C and D, each go high when a hole in the card passes between the corresponding photodiode/light emitting diode pair. Comparator 30, which for example can be National Semiconductor level comparator LM339, compares the output from each photodiode to its level set input to determine which photodiode outputs are high. Since the tolerances of each pair may vary, there may be some delay between the separate photodiodes going high for a particular code, i.e. when two or more photodiodes should be high simultaneously, as for example in the case described above for the musical note F. The synchronization photodiode E is slightly offset behind the other photodiodes to allow all of the photodiodes A, B, C and/or D that are supposed to be high for a particular code (i.e., a particular musical note) to reach that high state before the photodiode E goes high. When the photodiode E goes high, a pulse signal is generated from pulse generator 50, which for example can be RCA pulse generator 4098, that allows comparator outputs A, B, C and/or D to be latched in latch 40, which for example can be RCA latch 4076. The latched signals represent the code for a particular musical note in accordance with the table in FIG. 5.

The pulse signal from pulse generator 50 is also used to enter the new musical note code into memory 60, as mentioned above. More specifically, the outputs of the photodiodes are level compared in comparator 30 to determine which photodiodes are in the high state.

Subsequently, when photodiode E goes to the high state a pulse signal is generated from pulse generator 50 which is applied to latch 40 in order to latch the comparator outputs A, B, C and/or D representing the code for a particular musical note. The pulse signal is also provided from pulse generator 50 to code memory 60 in order to enter the new note code into the memory.

Upon completion of a predetermined number of musical notes, for example, in a preferred embodiment after the 18th note (positons a–r on the card shown in FIG. 4), the all high code, common to all encoded melodies, signifying the end of the portion of the melody to be reproduced causes the A, B, C, D and E outputs to all go high. The all high state when received by function decoder 70 (which for example can be RCA decoder 4067) from latch 40 outputs a signal to code memory 60 to shift device 100 from the record mode to the playback mode. After a short delay, the code memory 60 sends the card code to decoder and top octave generator 80, which then plays back the appropriate musical notes through a speaker 90. The decoder and top octave generator 80 can be comprised of, for example, RCA decoder 4067 and National Semiconductor oscillator NE 555. The code memory 60 and decoder and top octave generator 80 can be provided by Texas Instruments integrated circuit MP 1114.

The melody, thus played, can also be re-played by activation of a manual switch (unshown). Thus, device 100 remains in the playback mode until a new encoded card is inserted. When a new card is inserted into device 100 (or the card is re-oriented to play a song from a different quadrant), the first code entered on each card is the all low state at the card's edge, position a shown on the card in FIG. 4, where the photodiodes A through D are blocked. The all low state causes function decoder 70 to output a signal which clears code memory 60, i.e., erases all previously stored codes, and shifts code memory 60 to the record mode in order to prepare for acceptance of the codes of a new melody or song.

Figures 2, 5:
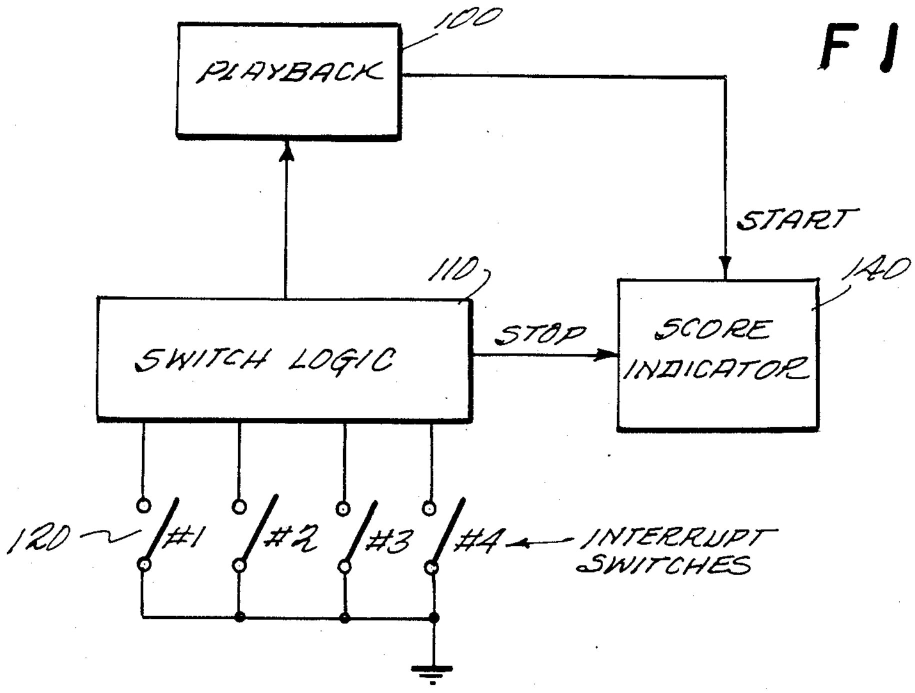
FIG. 2 represents a schematic block diagram of a control option for the invention.
FIG. 5 is a table which shows one scheme for encoding musical notes.

In addition to the 13 notes of the full octave, as shown in FIG. 5, one additional code (B, C and D high, A low) is used for a pause (shown as position j on the card of FIG. 4) which is used at appropriate places in the melody portion to be reproduced.

In a control variation of the device 100, as shown in FIG. 2, four or more independent interrupt switches 120 are used to stop playback and activate a light (unshown) which indicates which switch was first actuated. In this manner, the various players of the game can stop the music when they think they have correctly identified the song or melody being played. A reverse counter or score indicator 140 is used to specify a point value on the melody to be identified, with a higher point value assigned to a melody which has been identified with a fewer number of musical notes having been played. Thus, the counter counts down as the musical notes are played. The activation of one of switches 120 provides a signal to switch logic 110 which stops the playback of the device 100 and also stops the reverse counter or score indicator 140 at a particular point value.

FIG. 4 shows a typical card having four songs or melodies at its four quadrants. As can be seen in FIG. 4, the holes corresponding to code E run down the center of the card so that no matter how the card is oriented its upper left-hand or northwest quandrant indicates the song or melody to be reproduced and the position of code E will always be on the extreme right-hand side of the quandrant of the card which is being played. It should be noted that with respect to FIG. 1 the photodiode/light emitting diode pair E is shown at the left-hand portion of the device, however, this is only for the convenience of illustrating all of the components of the device 100 and thus does not exactly correspond to the layout of the card as shown in FIG. 4. As will be clear to those of ordinary skill in the art, the card shown in FIG. 4 can be oriented so that each of the songs 1–4 can appear at the upper left-hand portion of the card with the proper orientation of codes A–E for that song's playback, when the card is inserted into the device 100.

Figure 3:
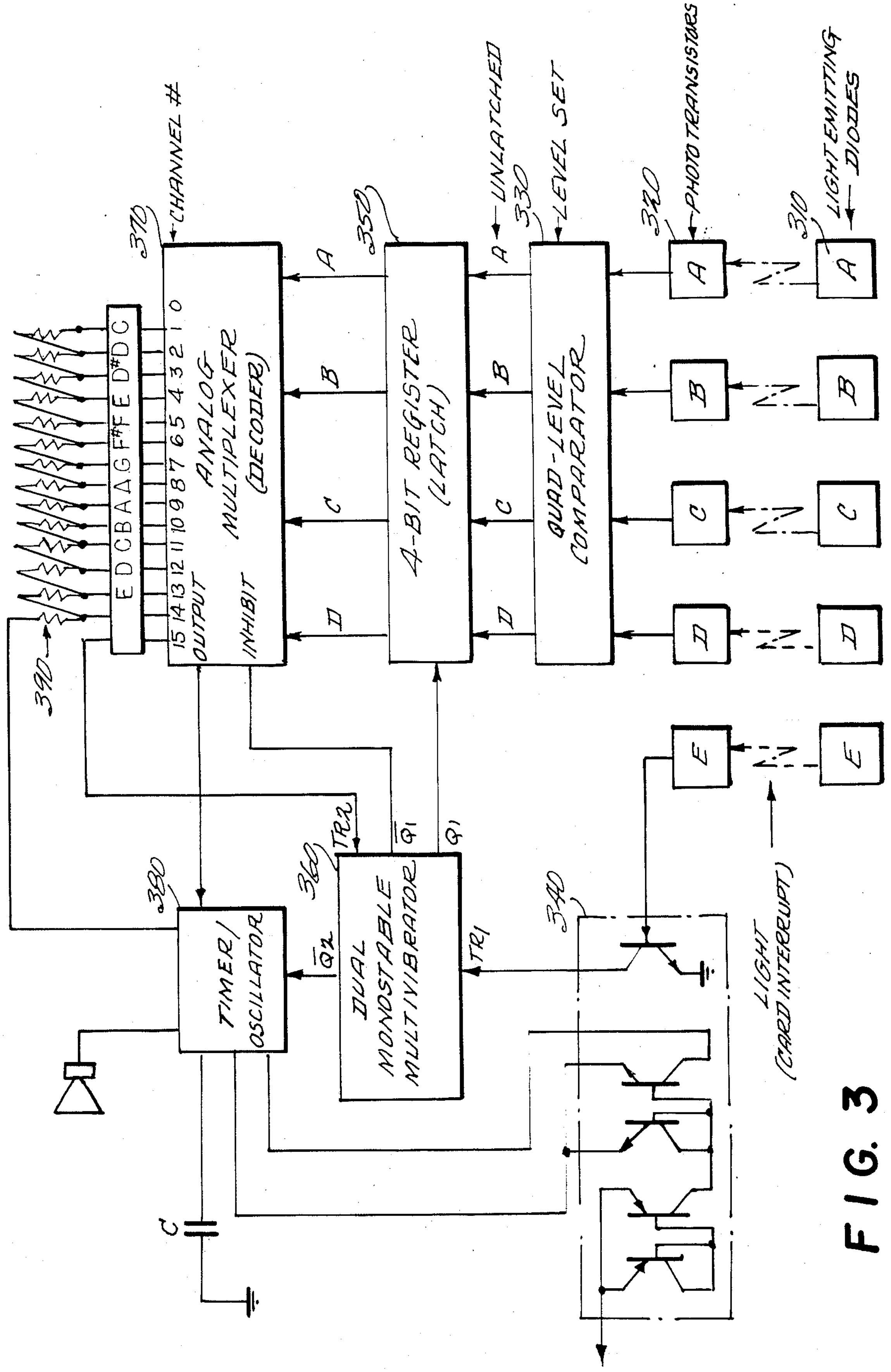
FIG. 3 represents a schematic block diagram of a second embodiment of the invention.

In a second preferred embodiment shown in FIG. 3, a set of light emitting diodes 310 faces a set of phototransistors 320. The light emitting diodes can be, for example, provided by Texas Instruments, Catalog No. TIL38 and the phototransistors similarly can be provided by Texas Instruments, Catalog No. TIL78. The light from the light emitting diodes is passed or interrupted according to the predetermined punched hole pattern on a melody card as has been described above. A comparator 330, for example RCA Catalog No. CS339, is used to determine whether data signals A, B, C and/or D are high when compared to a level set input. As a fifth comparator for the signal E, an unused transistor stage in an NPN/PNP array of transistors 340, for example RCA Catalog No. CA3096, can be used. The A, B, C and D levels are latched by a strobe signal, produced when phototransistor E goes high, in four-bit register latch 350, which for example can be RCA Catalog No. CD4076, and are fed to analog multiplexer 370, which can be, for example, RCA Catalog CD4067.

The strobe signal triggers one stage of a dual monostable multivibrator 360, for example RCA Catalog No. CD4098. The on-state of multivibrator 360 is set by an external timing resistor-capacitor combination of resistors 390 and capacitor C to the length of the musical note being played. The output $Q_1$ of the multivibrator 360 is connected to the clock input of latch 350 in order to latch the A–D levels, as described above, and the $\overline{Q}_1$ (complimentary) output is provied to the inhibit input of multiplexer 370 to turn it off except when a new musical note is called for.

In operation, multiplexer 370 selects one of the 15 channels corresponding to any one of the binary codes shown in the table of FIG. 5. Channels 1–13 are for the 13 musical notes used to play the songs. Each channel is tied to a resistor string so that the output to timer 380, for example RCA Catalog No. CA555, appears as an appropriate resistance value. The resistance value in combination with the capacitor C determines the oscillation frequency of the timer 380.

As noted above with the description of the first embodiment, the all low state (phototransistors A–D) cn channel 0 can be used to reset the device for a new song to be played. The all high state on channel 15 can be used to acknowledge the end of a particular song or melody and this state triggers the other half of multivibrator 360. Multivibrator 360 has a relatively long time constant of about ten seconds to allow the output $\overline{Q}_2$ (complimentary) to inhibit the oscillator output while the remaining half of the musical encoded car (i.e., the other quadrant behind the quadrant being played) passes between the array of light emitting diodes and phototransistors. The code for any particular channel can be used for a pause, similarly as described above with the description of the first embodiment.

The remaining NPN and PNP transistor pairs in transistor array 340 are used as a bipolar current source for the timer/oscillator 380 in order to provide a symmetrical output for all frequencies, as would be readily appreciated by those of ordinary skill in the art.

FIGS. *6a*–*6c* and *7a*–*7c* disclose alternative embodiments of card tray feeder mechanisms for feeding the encoded card between the light emitting diode and photodiode arrays of FIG. 1 or the light emitting diode and phototransistor arrays of FIG. 3. More specifically in FIGS. *6a*–*6c*, a card tray feeder mechanism 600 is shown to comprise a movable card tray C and a spring loaded gear mechanism B which is wound or energized from a knob A. In operation, knob A, as mentioned above, is used to wind up spring loaded gear mechanism B. An encoded musical card which is to be read is placed on the tray C and the knob A is pressed to release spring loaded gear mechanism B and thus begin movement of card tray C. Thus, the tray C is passed at a constant speed under light emitting diode array assembly D, and as the card passes under D, the card is read, in the manner disclosed above. After tray C has passed under the assembly D, the card is removed from the tray C and the tray is returned to its starting position.

As noted above, FIGS. *7a*–*7c* show an alternative card tray feeder mechanism 700 which includes a spring loaded mechanism having a roller B and a knob A which is used to wind the spring loaded mechanism. The card to be read is inserted under roller B until the back edge of the card is even with the back edge of tray C. The mechanism is begun by pressing knob A which releases roller B for rotation. As a result, the card is pulled under the light emitting diode assembly D by the rotation of roller B. The card is then removed after it has completely passed under assembly D and the knob A is then used to rewind the spring loaded mechanism in order for the next card to be read.

In FIGS. *6a*–*6c* and *7a*–*7c* a light emitting diode assembly has been shown for convenience only, but those skilled in the art would readily appreciate that a facing photodiode or phototransistor array would also be provided in accordance with the description of the invention set forth above.

It should be appreciated that the above described description of the preferred embodiments do not limit the scope of the present invention in any way, and that various changes and modifications may be made without departing from the spirit and scope of the present invention. For example, while a particular code for musical notes has been shown in FIG. 5 those skilled in the art would readily recognize that any other code could be used and that an encoding medium other than a card could be used, such as for example punched tapes or rotatable drums having perforations or raised portions.

What is claimed is:

1. A coded card for use in a melody playing apparatus which decodes said coded card, said coded card having four quadrants with each quadrant having a different melody coded therein, and a synchronization code encoded down the center of the card, between alternate ones of said quadrants, said card constructed such that by alternately rotating and turning the card over each of the four quadrants with different melodies and said synchronization code appears at a same predetermined quadrant position with respect to the melody playing apparatus, thus each of the melodies can be decoded by the melody playing apparatus.

2. The coded card of claim 1, wherein said coded card comprises a card having punched holes, said punched holes representing said coding.

3. A coded card for use with a melody playing apparatus, comprising:

an operative surface longitudinally divided down a center thereof by a synchronization code, and having four quadrants, two on each side of said synchronization code, each said quadrant extending from said synchronization code to an edge of said operative surface, four melodies being encoded in said four quadrants, respectively, each said melody being on a predetermined same side of said synchronization code when said card is turned in a correct direction to read said each melody.

4. A card as in claim 3 where said synchronization code and melody code are both formed by holes in said card.

* * * * *